United States Patent [19]
Gerkin et al.

[11] 3,896,303
[45] July 22, 1975

[54] POLYEPOXIDE-CAPROLACTONE POLYOLS AND COATINGS BASED THEREON

[75] Inventors: Richard Michael Gerkin, Charleston; Lowell Ray Comstock, South Charleston, both of W. Va.

[73] Assignee: Union Carbide Corporation, New York, N.Y.

[22] Filed: Nov. 14, 1973

[21] Appl. No.: 415,791

[52] U.S. Cl....260/78.3 R; 260/47 EP; 260/77.5 AN
[51] Int. Cl............................................. C08g 17/14
[58] Field of Search .................... 260/78.3 R, 47 EP

[56] References Cited
UNITED STATES PATENTS
3,169,945  2/1965  Hostettler et al. .......... 260/77.5 AN
3,408,421  10/1968  Kurka ........................... 260/78.3 R

*Primary Examiner*—M. J. Welsh
*Attorney, Agent, or Firm*—M. Klosty

[57] ABSTRACT

Compositions useful for the formation of high performance coatings are provided as the reaction products of a caprolactone polyol having an average hydroxyl functionality of at least three and a polyepoxide. The products formed by reaction of a caprolactone triol and a cycloaliphatic diepoxide are used with particular advantage as the active hydrogen-containing component of polyurethane formulations to be applied as coatings on external surfaces of aircraft.

12 Claims, No Drawings

POLYEPOXIDE-CAPROLACTONE POLYOLS AND COATINGS BASED THEREON

This invention relates to the field of caprolactone polyols and coating compositions, particularly urethane coatings, derived therefrom.

BACKGROUND OF THE INVENTION

It is known that caprolactone polyols are suitably employed in forming urethane coatings and that they offer a number of advantages over conventional polyester polyols. One of these advantages is that reaction of caprolactone polyols with polyisocyanates generally provides urethane coatings having better weathering characteristics. Clear coatings for exterior application are obtained from caprolactone polyols and aromatic polyisocyanates such as tolylene diisocyanates but such coatings tend to yellow due to the known light instability associated with aromatic diisocyanates.

It is also known that light stable urethane coatings are provided by reaction of caprolactone polyols with aliphatic diisocyanates. However, polyisocyanates of the latter type such as, in particular, 4,4'-methylene-bis(-cyclohexylisocyanate), either provide toxic coatings due to significant amounts of unreacted isocyanate, or otherwise tend to provide soft coatings not suitable for many high performance applications. One such end-use is the coating of exterior aircraft surfaces. The requirements of such coatings are particularly severe for, in addition to exterior durability characteristics such as high hardness, good impact resistance, adhesion, stain resistance and low temperature flexibility, the coating must possess considerable chemical resistance to potential attack by aircraft hydraulic fluids.

It is, therefore, a primary object of this invention to provide particular caprolactone-based polyols which are especially useful in the formation of high performance coatings.

Another object is to provide such polyols which are used with particular advantage in forming light stable, urethane coatings having good hardness, weatherability and substantial chemical resistance to hydraulic fluids.

A further object is to provide improved urethane coatings for application to external aircraft surfaces.

Various other objects and advantages of this invention will become apparent to those skilled in the art from the accompanying description and disclosure.

SUMMARY OF THE INVENTION

In accordance with one aspect of the teachings of this invention, highly functional caprolactone polyols useful in forming coating compositions, are provided as the products formed by the reaction of a caprolactone polyol having an average hydroxyl functionality of at least three with a polyepoxide having an epoxy functionality of at least two. It has been discovered that the polyepoxide-caprolactone polyol adducts provided by the present invention are especially adapted to forming high performance urethane coating compositions having the aforementioned desirable characteristics of exterior durability and chemical resistance. In accordance with another aspect of the teachings of this invention, twopackage urethane coating compositions are provided which comprise the (1) polyepoxide-caprolactone polyol adducts described herein, and (2) an organic polyisocyanate.

DETAILED DESCRIPTION OF THE INVENTION AND PREFERRED EMBODIMENTS

The parent caprolactone polyol which is reacted with a polyepoxide as described herein is provided by the reaction of an epsilon-caprolactone in the presence of a polyhydric initiator having at least three reactive hydrogen atoms present as hydroxyl. The epsilon-caprolactone monomers have the general formula,

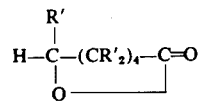

where R' is hydrogen or lower alkyl, that is, a linear or branched alkyl group having from 1 to 4 carbon atoms such as methyl, ethyl, propyl, isopropyl, butyl and t-butyl. Usually at least six of the R' groups are hydrogen and the remaining three are hydrogen, methyl or any combination thereof. The caprolactone polyol, which is reacted with a polyepoxide as described herein, has a hydroxyl functionaltiy corresponding to that of the polyhydric initiator and contains at least one oxycaproyl unit, that is,

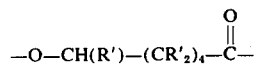

Usually, the average number of such units is no more than about 10. More specifically, the caprolactone polyol reactants are prepared by the reaction of the aforesaid epsilon-caprolactone monomers with a y-functional polyhydric initiator where y has a value of at least three and is usually no more than six, employing a monomer to initiator mole ratio of from 1:1 to about 10:1. The preparation of the parent caprolactone polyols is illustrated by the following equation which is specific to the preferred monomer, epsilon-caprolactone:

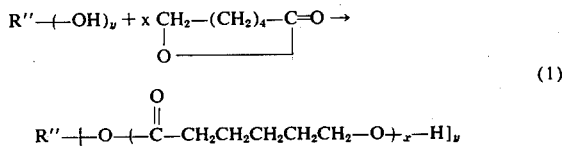

(1)

where R'' denotes the residue of a polyhydric alcohol after substracting y number of —OH groups, y being as aforesaid, and x has a value of from 1 to about 10. It is to be understood that when x has a value of one, for example, the oxycaproyl unit is terminated by one hydroxyl group and y-1 hydroxyl groups remain bonded to R'' of the polyhydric initiator.

Illustrative of suitable polyhydric initiators encompassed by R''+OH)$_y$ are the following: glycerol, trimethylolethane, trimethylolpropane, 1,2,4-butanetriol, 1,2,6-hexanetriol, pentaerythritol, dipentaerythritol, oxyethylated and/or oxypropylated adducts of such compounds such as, for example, ethylene oxide adducts of trimethylolpropane, and mixtures of any of the aforesaid initiators. It is evident, therefore, that R'' is a saturated, aliphatic radical having at least three carbon atoms and consists of carbon and hydrogen, or carbon, hydrogen and oxygen where oxygen is present solely as ether oxygen as in dipentaerythritol or the aforementioned oxyalkylated adducts. The more commonly employed initiators have no more than 10 carbon atoms.

The generally preferred class of caprolactone polyols for use in preparing the novel polyepoxide reaction products thereof, are the epsilon-caprolactone triols having an average molecular weight from about 300 to about 1300, or corresponding hydroxyl numbers from about 560 to about 130. Most preferred are the triols having an average molecular weight no higher than about 900 and a hydroxyl number no less than about 185.

The parent caprolactone polyols which are reacted with polyepoxides as described herein are prepared by methods known to the art such as those described in U.S. Pat. No. 3,169,945, the teachings of which are incorporated herein by reference thereto. It is generally preferred that the reaction between the polyhydric initiator and monomer be effected at a temperature between about 130°C. and about 200°C. in the presence of a catalyst such as stannous octoate or the other catalysts disclosed in said patent.

The polyepoxides used in preparing the novel polyol compositions of the present invention comprise those organic materials which have at least two vicinal epoxy groups having the structure,

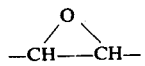

which may be in a linear position or the carbon atoms thereof may be common to a saturated, five-, six- or seven-membered carbocyclic ring. When present in a linear position, the epoxy groups may be terminal, that is,

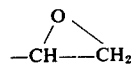

groups, or they may be internal, that is,

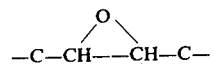

groups. Usually, the polyepoxide reactants contain no more than four of any one or combination of the aforesaid types of vicinal epoxy groups. The polyepoxide reactants are essentially free of ethylenic or acetylenic sites of unsaturation, that is, they are free of unsaturation of the non benzenoid type. It is to be understood, however, that they may comprise one or a plurality of aromatically unsaturated carbocyclic nuclei. Usually, no more than two of such aromatic nuclei are present. In addition to non benzenoid unsaturation, the polyepoxide reactants are essentially free of functional groups other than epoxy. The polyepoxides, therefore, consist of the elements carbon, hydrogen and oxygen with the following provisos: (1) when the molecule contains oxygen in addition to oxygen of the epoxy groups, such additional oxygen is present either as ether oxygen, that is —C—O—C, or as the carbonyloxy group of carboxylic acid ester (or carboxylate) groups, that is, —C—C(O)O—C—; and (2) when aromatic nuclei are present in the molecule, the ring carbon atoms thereof may be substituted with bromine or chlorine. Usually, the polyepoxides employed in the practice of this invention contain from 8 to 30 carbon atoms per molecule, although certain polyepoxides derived from naturally occurring oils may contain a greater number of carbon atoms.

From the standpoint of providing reaction products which are useful in forming urethane coatings for exterior application, it is preferred to react the base caprolactone polyol with a cycloaliphatic diepoxide. As used herein, the expression "cycloaliphatic diepoxide" is intended to include compounds in which the respective carbon atoms of both epoxy groups are either common to a saturated carbocyclic nucleus or linear thereto, as well as compounds in which the carbon atoms of one epoxy group are common to the carbocyclic nucleus and the second epoxy group is linear thereto. Such cycloaliphatic diepoxides include compounds having two 3,4-epoxycyclohexyl groups that are linked by an ester-containing organic moiety. Suitable compounds of this type include diepoxides having the general formula:

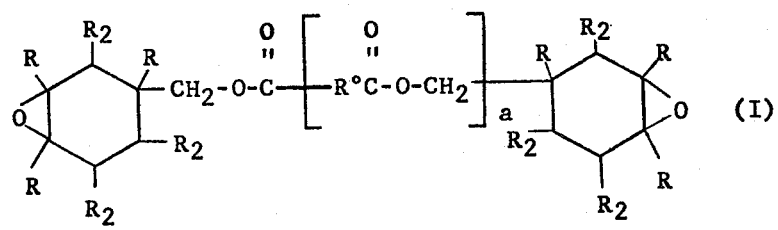

wherein R represents hydrogen or lower alkyl radicals, that is, alkyls having from 1 to 4 carbon atoms, R° is a valence bond or a divalent hydrocarbon radical having from 1 to 9 carbon atoms and is free of non benzenoid unsaturation, and a has a value of zero or one. It is to be understood that the R groups may be the same as or different from one another. Preferred compounds encompassed by Formula I are those wherein R is hydrogen or methyl and no more than two of the nine R groups bonded to each ring are methyl.

When a of Formula I is zero, the diepoxides are 3,4-epoxycyclohexylmethyl 3,4-epoxycyclohexanecarboxylates having the formula,

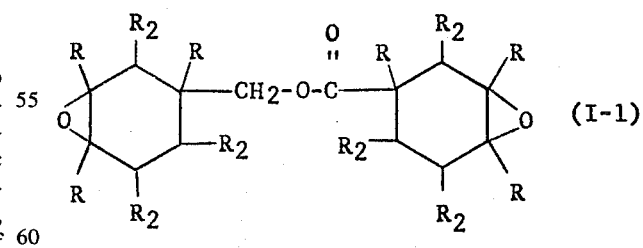

Among specific compounds falling within the scope of Formula I-1 are the following:
3,4-epoxycyclohexylmethyl 3,4-epoxycyclohexanecarboxylate;
3,4-epoxy-1-methylcyclohexylmethyl 3,4-epoxy-1-methylcyclohexanecarboxylate;
3,4-epoxy-6-methylcyclohexylmethyl 3,4-epoxy-6-methylcyclohexanecarboxylate;

3,4-epoxy-3-methylcyclohexylmethyl 3,4-epoxy-3-methylcyclohexanecarboxylate; and
3,4-epoxy-5-methylcyclohexylmethyl 3,4-epoxy-5-methylcyclohexanecarboxylate.

Other suitable compounds within Formula I-1 are described in U.S. Pat. No. 2,890,194 to B. Phillips et al., issued June 9, 1959.

When $a$ of Formula I has a value of one, the compounds are diepoxides of cycloaliphatic esters of dicarboxylic acids having the formula,

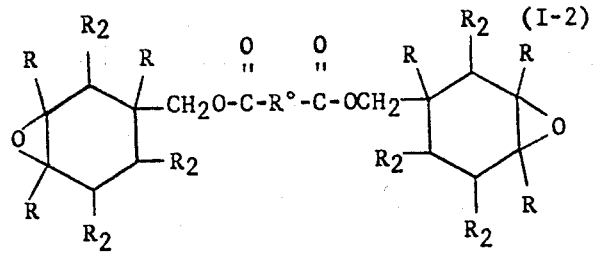

where R and R° are as previously defined. Preferably, R° is a bivalent alkylene radical of the series, $-C_mH_{2m}-$, where $m$ has a value from 2 to 6 such as ethylene ($-CH_2CH_2-$), tetramethylene, pentamethylene and hexamethylene. Among specific diepoxides encompassed by Formula I-2 are the following:
bis(3,4-epoxycyclohexylmethyl)oxalate;
bis(3,4-epoxy-6-methylcyclohexylmethyl)succinate;
bis(3,4-epoxycyclohexylmethyl)adipate;
bis(3,4-epoxy-6-methylcyclohexylmethyl)adipate; and
bis(3,4-epoxycyclohexylmethyl)pimelate.

Other suitable compounds within Formula I-2 are described in U.S. Pat. No. 2,750,395, to B. Phillips et al., issued June 12, 1956.

Another class of cycloaliphatic diepoxides of the cyclohexene oxide type which are suitably reacted with caprolactone polyols as described herein, are those wherein the two 3,4-epoxycyclohexylmethyl rings shown in Formula I-2 are linked through an oxy (—O—) group, in place of the dicarboxylate bridge. Illustrative of such compounds is bis(3,4-epoxycyclohexylmethyl)ether.

Other suitable cycloaliphatic diepoxides in which the respective carbon atoms of each epoxy group are common to a saturated carbocyclic ring are the following: 2,2-bis(3,4-epoxycyclohexyl)propane which has the formula,

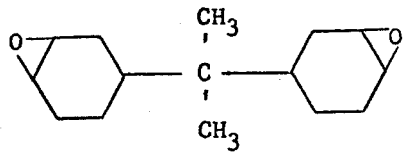

bis(2,3-epoxycyclopentyl)ether which has the formula,

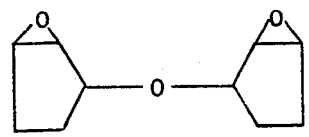

dicyclopentadiene dioxide (that is, 1,2:5,6-diepoxyhexahydro-4,7-methanoindan) which has the formula,

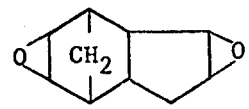

It is to be understood that, in addition to the above-described cycloaliphatic diepoxides wherein the carbon atoms of both epoxy groups are common to a carbocyclic ring, only one need be so positioned and the second epoxy group may be linear thereto. Illustrative of this type of compound for reaction with caprolactone polyols as described herein, is 4-(1,2-epoxyethyl)-1,2-epoxycyclohexane which has the formula,

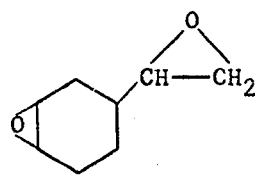

Other suitable cycloaliphatic diepoxide reactants are those in which both epoxy groups are linear to the carbocylic nucleus as in 2,2-bis[4-(2,3-epoxypropoxy)-cyclohexyl]propane which has the formula,

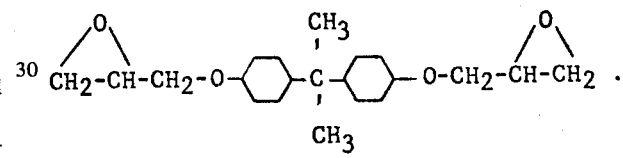

Illustrative of suitable aromatic polyepoxides for reaction with caprolactone polyols as described herein are those in which the aromatic cyclic nucleus is substituted with a 2,3-epoxypropoxy group, that is,

This class of reactants are exemplified by the following compounds:
1,3-bis(2,3-epoxypropoxy)benzene;
2,2-bis[p-(2,3-epoxypropoxy)phenyl]propane which has the formula,

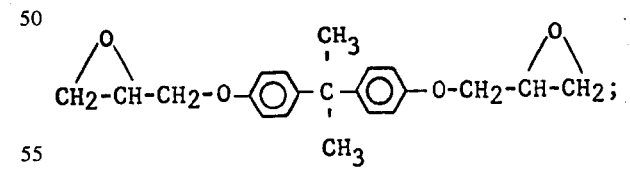

and 2,2-bis[4-(2,3-epoxypropoxy)-3,5-dibromophenyl]propane.

Another class of polyepoxides comprising a cyclic nucleus that is contemplated for use in preparing the novel polyol compositions of this invention are glycidyl esters of aromatic and saturated cycloaliphatic dicarboxylic acids such as, for example, diglycidyl phthalate which has the formula,

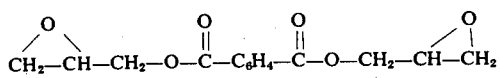

$$CH_2-CH-CH_2-O-C-C_6H_4-C-O-CH_2-CH-CH_2$$

Although the above-described diepoxides containing a carbocyclic nucleus are the generally preferred classes of polyepoxides for use in preparing the novel polyols of the present invention, acyclic polyepoxides are also contemplated. Illustrative of such reactants are: 1,2,3-tris(2,3-epoxypropoxy)propane; 1,4-bis(2,3-epoxypropoxy)butane; and epoxidized soybean oil.

The above-described caprolactone polyols and polyepoxides are reacted in relative proportions such that sufficient hydroxyl groups are present in the system to react substantially all of the epoxy groups. The reaction is effected at a temperature between about 100°C. and about 190°C., usually between about 130°C. and about 175°C., and proceeds satisfactorily at substantially atmospheric pressure. The reaction is carried out for a sufficient period of time to obtain substantially complete reaction of the epoxy groups, that is, until the oxirane content is less than about 0.5 weight percent. This condition is readily determined by periodic sampling of the reaction mixture and analyzing for oxirane content by standard procedures.

In accordance with a preferred embodiment for producing the polyol compositions of the invention, substantially about $z$ moles of caprolactone polyol per mole of the polyepoxide are employed where $z$ is the epoxy functionality of the polyepoxide which, as previously defined, is at least two and usually no more than four. By "substantially about" in this context is meant no less than 10 percent below and no more than 25 percent above any given value of $z$. Otherwise stated, the preferred mole ratio of caprolactone polyol to polyepoxide is from about $(z \text{ minus } 0.1z):1$ to about $(z + 0.25z):1$, where $z$ has a value from 2 to 4. Thus, the preferred mole ratio of caprolactone polyol to polyepoxide is from about 1.8:1 to about 5:1, the particular mole ratio employed depending upon the epoxy functionality (that is, the value of $z$) of a given polyepoxide reactant. For example, when a diepoxide is used, the preferred mole ratio of caprolactone polyol to diepoxide is from about 1.8:1 to about 2.5:1. From the standpoint of providing polyol products having a maximum hydroxyl functionality, it is most preferred to employ about $z$ moles of caprolactone polyol reactant per mole of polyepoxide. For this purpose, therefore, the most preferred mole ratio of polyol reactant to polyepoxide reactant is from about 2:1 to about 4:1, depending upon the functionality of the particular polyepoxide employed. It is to be understood that, provided the reaction system contains sufficient free -OH to effect substantially complete reaction of the epoxy groups, mole ratios encompassing limits outside of the said preferred and most preferred ranges may be employed without departing from the scope of this invention. Thus, the reactants may be employed in equimolar amounts up to an amount usually no greater than about $(z + 0.5z)$ moles of caprolactone polyol per mole of polyepoxide.

While not wishing to be held to any particular theory or reaction mechanism, it is believed that during the reaction of the caprolactone polyol and polyepoxide, at least a major portion of the epoxy groups are monofunctional when reacted with hydroxyl of the caprolactone polyol such that the equivalent of one hydroxyl group of the polyol reacts with a single epoxy group to open the oxirane ring to form a hydroxyl group on one of the oxirane carbon atoms, and an ether linkage with the second oxirane carbon atom and a carbon atom of the polyol. By way of illustration, reference is had to the following equations (2) and (3) wherein equation (2) illustrates the formation of a caprolactone triol, designated as "A," which is then reacted in equation (3) with one of the above-described cycloaliphatic diepoxides of the cyclohexene oxide type in a stoichiometric mole ratio of 2:1, respectively.

Equation 2:

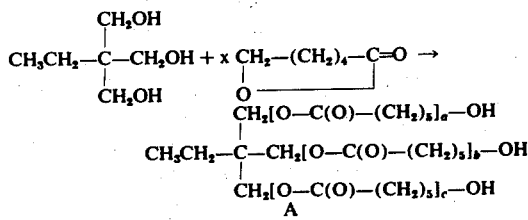

Equation 3:

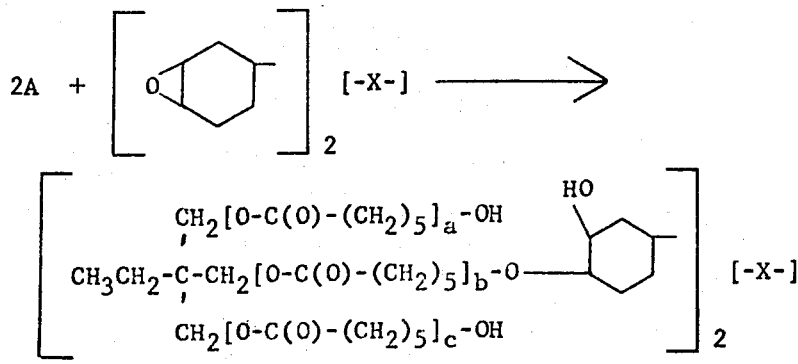

In the above equations, $a$, $b$, and $c$ can be zero or a positive number provided the sum $a+b+c$ has the value of $x$ which, as above defined, is from 1 to about 10, and X is any of the above-defined bivalent groups that links the two 3,4-epoxycyclohexyl nuclei such as $-CH_2-O-C(O)-$, $-CH_2-O-C(O)-R^\circ-C(O)-O-CH_2-$, $-O-$ or $-C(CH_3)_2-$. It is to be understood that the structure of the product shown in equation (3) is illustrative only and that any of the three hydroxyl groups of the caprolactone polyol reactant (A) may react to open the oxirane groups of the diepoxide reactant.

It is desirable that the hydroxyl functionality of the novel polyol products of the invention be substantially greater than that of the parent polyol reactant. To this end, it is recommended practice to employ the reactants within the above-discussed preferred and most preferred mole ratios. For example, when the polyols of the invention are prepared employing about $z$ moles of parent caprolactone polyol per mole of polyepoxide, as a general rule the functionality of the polyol product is at a maximum and is about $z$ times that of the parent polyol where $z$, as previously defined, is the epoxy functionality of the particular polyepoxide employed. For example, in accordance with the mechanism on which the reaction of equation (3) is based, the triol-diepoxide adduct has a maximum hydroxyl functionality of six, that is, twice that of the parent caprolactone triol reactant.

It is to be understood that the structure of the products shown in equation (3) may be oversimplified and that the reaction products may comprise additional compounds formed, for example, by reaction of the —OH group formed upon opening of the oxirane ring with an epoxy group of another molecule. The polyol product may also comprise species formed by a mechanism involving the reaction of the hydroxyl group of the polyol with ester functionality in the bisepoxides encompassed by above Formula I-2. It is to be understood, therefore, that although it is believed that the polyol compositions of this invention are predominantly adducts formed by the mechanism discussed with reference to equation (3), they may also comprise structures of a different or more complex nature.

The novel polyols of the invention comprising the products formed by reaction of the above-described caprolactone polyols and polyepoxides have hydroxyl numbers from about 560 to about 50, and an average molecular weight from about 600 to about 6700. Hydroxyl number is determined by and is defined as the number of milligrams of potassium hydroxide required for the complete neutralization of the hydrolysis product of the fully acetylated derivative prepared from one gram of polyol or mixture of polyols. The hydroxyl number is also defined by the following equation which reflects its relationship with the functionality and molecular weight of the polyol:

$$OH = \frac{56.1 \times 1000 \times f}{M.W.}$$

wherein
OH = hydroxyl number of the polyol;
f = average functionality, that is, average number of hydroxyl groups per molecule of polyol; and
M. W. = average molecular weight of the polyol.

The reaction of the caprolactone polyol and polyepoxide may be effected in the absence or presence of a catalyst, and is usually effected in the presence of a catalyst. Metal catalysts, particularly organic derivatives of tin including stannous and stannic compounds, are especially suitable. Illustrative of this type of catalyst are the following which may be employed individually or in combination: stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such tin salts as well as dialkyltin oxides, trialkyltin oxides, tin mercaptides such as, for example, di-n-octyl tin mercaptide, and the like. The catalyst is used in a catalytically effective amount which is usually between about 0.001 and about 0.1 weight percent of the combined total weight of the caprolactone polyol and polyepoxide reactants.

If desired, the reaction may be carried out in the presence of a solvent or diluent that will not interfere with the desired formation of the caprolactone polyol-polyepoxide adducts described herein. Such diluents are well known and include ethers, hydrocarbons and ketones such as diethyl ether, p-dioxane, dibutyl ether, tetrahydrofuran, diisopropyl ether, methyl ethyl ketone, methyl n-propyl ketone, hexane, toluene, xylene, benzene, and the like.

The polyol products of the invention are generally normally liquid, including vary viscous, materials. They are recovered by conventional techniques, depending upon the physical nature of the particular reaction product. For example, the more viscous products are recovered as the residue products remaining after any volatile material such as diluent is separated.

The novel polyol products of the invention are useful in forming polyurethane products, particularly polyurethane coatings, by reaction with polyisocyanates. From the standpoint of providing relatively hard coatings for application to rigid surfaces such as metals, those polyols having hydroxyl numbers from about 560 to about 300 are generally preferred. When the polyol products of the invention are to be used to form softer polyurethane coatings for application to a more flexible substrate such as cloth, leather, vinyl or magnetic tape, the products having hydroxyl numbers from about 300 to about 50 are usually selected.

The polyisocyanates reacted with the novel caprolactone polyol-polyepoxide adducts of the present invention are known to the art and any such reactants containing freeNCO groups are suitably employed. Among such suitable reactants are aliphatic, cycloaliphatic, araliphatic and aromatic polyisocyanates, and biuret-containing polyisocyanates. Usually, the aromatic polyisocyanates are used in applications not requiring light stable coatings. Illustrative of suitable polyisocyanates for reaction with the novel polyol compositions of the present invention are: 1,4-hexamethylene diisocyanate; 1,6-hexamethylene diisocyanate; 4,4'-methylene-bis(-cyclohexylisocyanate), also sometimes named 4,4'-dicyclohexylmethane diisocyanate; bis-(2-isocyanatoethyl)fumarate; 2,4-tolylene diisocyanate, 2,6-tolylene diisocyanate and mixtures of these isomers; crude tolylene diisocyanates; 4,4'-diphenylmethane-diisocyanate; 6-isopropyl-1,3-phenylene-diisocyanate; durylene diisocyanate; 4,4'-diphenylpropane diisocyanate; 3,5,5-trimethyl-3-isocyanato-methyl-cyclohexane-isocyanate-(1), commonly referred to as "isophorone-diisocyanate"; biuret-containing polyisocyanates such as those prepared by reaction of any of the above diisocyanates with water at a molar ratio of at least 3:1 to about 6:1, as described in U.S. Pat. Nos. 3,706,678 and 3,201,372, and N,N',N''-tris-(isocyanatohexyl)-biuret; triphenylmethane-4,4',4''-triisocyanate; and any of the other organic polyisocyanates well known to the polyurethane art. For example, other useful polyisocyanates for reaction with the novel polyols of this invention are: the polyphenylmethylene polyisocyanates produced by phosgenation of the polyamine obtained by acid-catalyzed condensation of aniline with formaldehyde. Polyphenylmethylene polyisocyanates of this type are available commercially under such tradenames as PAPI, NIAX Isocyanate AFPI, Mondur MR, Isonate 390P, NCO-120, Thanate P-220, NCO-10 and NCO-20. These products are low viscosity (50-500 centipoises at 25°C.) liquids having average isocyanato functionalities in the range of about 2.25 to about 3.2 or higher, and free —NCO contents of from about 25 to about 35 weight per cent, depending upon the specific aniline-to-formaldehyde molar ratio used in the polyamine preparation.

The novel polyol compositions of the present invention are reacted with the organic polyisocyanate reactant in an amount sufficient to provide an —NCO/—OH equivalent ratio of from about 0.8:1 to about 1.4:1, preferably from about 1:1 to about 1.2:1.

The reaction between the polyisocyanate and the caprolactone polyol-polyepoxide adducts provided by the invention may be carried out in the presence or absence of a catalyst. Usually, a catalyst is used. Such catalysts are known to the polyurethane art and include any of the above-described organic derivatives of tin such as, in particular, tin salts of organic acids and organotin compounds. Of these, dibutyltin dilaurate is especially preferred. It is to be understood, however, that any other tin catalyst can be used such as stannous octoate, as well as other metal catalysts such as lead octoate. When used, the catalyst for promoting the —NCO/—OH reaction is present in the formulation in amounts from about 0.001 to about 0.05 weight percent, based on the polyurethane-forming reactants.

Other components which may be present in minor amounts in the coating formulation are organosilicones which function as surface coating leveling aids. Such organo-silicones are known to the art and include polydimethylsiloxane oils and polydimethylsiloxane-polyoxyalkylene copolymers of relatively low molecular weight. Other conventional additives such as pigments, colors, diluents or solvents, fillers, plasticizers and grinding aids may be added, depending upon the end-use application of the coating formulation.

In the ordinary practice of this invention, the novel polyols of the invention are packaged separately from the polyisocyanate reactant. These separate components are admixed and applied to the substrate to be coated while in the fluid state. The coating can be applied to any acceptable substrate such as metal, wood, glass, fabrics, leather, glass reinforced polyester and other plastics. The caprolactone triol/cycloaliphatic diepoxide adducts are especially useful in providing urethane top-coatings for aircraft, tank cars, tank trucks, storage tanks, appliances and boats. The urethane coating formulations of the invention are applied to the substrate in conventional manner such as by spraying, brushing, dipping, roll-coating, or other techniques known to the art.

As desired, viscosity of the coating formulation can be reduced by the addition of inert diluents or solvents conventionally employed for this purpose. Suitable solvents include: esters such as ethyl acetate, butyl acetate, and 2-ethoxyethyl acetate (Cellosolue acetate); ketones such as methyl ethyl ketone and methyl isobutyl ketone; aromatic hydrocarbons such as benzene, toluene, xylene, mineral spirits and other aromatic petroleum distillates. Mixtures or blends of such diluents are also suitably employed. The coatings may be cured at room temperature or by the application of heat up to about 150°C., for example, in order to accelerate the rate of curing and drying, that is, removal of solvent when used.

The caprolactone-polyepoxide adducts of the invention are also useful in coatings other than urethane coatings. For example, they can be cured with melamine resins such as those available under the tradenames Cymel 300, supplied by American Cyanamid Company, and Resamine X745, supplied by Monsanto Company to yield hard, chemically resistant coatings. Flexibility of such coatings can be enhanced by the addition of relatively small amounts such as from about 2 to about 20 weight percent, of a caprolactone triol and an aliphatic polyisocyanate.

The following examples are offered as illustrative of the present invention and are not to be construed as unduly limiting.

For the sake of brevity, designations are used in the data which follow to denote the materials identified in the following Table I.

TABLE I

| Designation | Composition |
| --- | --- |
| Polyol A | This is a caprolactone triol having a Hydroxyl No. of 560 and an average molecular weight of 300 (equivalent weight = 100). It is prepared by the reaction of trimethylolpropane as initiator with epsiloncaprolactone monomer in the presence of stannous octoate catalyst (0.002 weight percent, based on weight of total charge), at a temperature of approximately 190°C. and a mole ratio of monomer to initiator of about 1.45:1 |
| Polyol B | This is a decafunctional polyester polyol prepared from phthalic anhydride and trimethylolpropane. This polyol has a Hydroxyl No. of 230–270 and an average equivalent weight of 225, and is supplied by Bayer Aktiengesellschaft under the tradename Desmophen 650A. |
| Polyisocyanate A | This is a biuret of 1,6-hexamethylene diisocyanate having a free-NCO content of 17.12 weight percent and an equivalent weight of 245.3. It is supplied by Bayer Aktiengesellschaft under the tradename Desmodur N. |
| Silicone A | This is a polysiloxane-polyoxyalkylene block copolymer having the average formula, $Me_3SiO(Me_2SiO)_7[BuO(C_3H_6O)_{12}C_3H_6SiMeO]_3SiMe_3$ where Me and Bu represent methyl and butyl, respectively. |
| Formulation A | This is a commercial aircraft coating supplied by U.S. Paint Lacquer and Chemical Company as Alumigrip Aircraft Coating System. It is a pigmented, fully formulated two-package urethane coating based on Polyisocyanate A and modified Polyol B. |

EXAMPLE 1

Preparation of polyol I

The reaction of this example was carried out in a four-necked round bottom flask equipped with a mechanical stirrer, heating mantle, nitrogen sparge tube and condenser. The reactor was charged with:

a. 3,4-epoxycyclohexylmethyl (3,4-epoxycyclohexane)carboxylate in an amount of 320.8 grams (based on purity, 1.13 moles);

b. Polyol A in an amount of 679.2 grams (2.26 moles); and c. Stannous octoate catalyst in an amount of 0.5 grams, corresponding to 0.05 weight percent of the combined weight of (a) and (b). Samples were taken at intervals and analyzed for percent oxirane content. The reaction mixture was heated at 160°C. for a total reaction time of about 12-13 hours after which period the oxirane content was nil indicating essentially complete reaction of the epoxy groups. The product was discharged from the reactor as a very viscous liquid and, upon analysis, was found to have a Hydroxyl No. of 362.9 mg. KOH/gram. The acid number was nil. On the basis of its hydroxyl number and a hydroxyl functionality of six, the product has a molecular weight of 927.5 or an equivalent weight of 154.5 (theoretical equivalent weight = 142.0). The reaction product of this example is referred to herein as Polyol I.

EXAMPLE 2

Preparation of Polyol II

Following substantially the same procedure described under Example 1, the reactor was charged with: Polyol A in an amount of 2716.7 grams (9.05 moles); 3,4-epoxycyclohexylmethyl (3,4-epoxycyclohexane)-carboxylate in an amount of 1283.24 grams (based on purity, 4.52 moles); and stannous octoate catalyst in an amount of 1.0 gram (0.025 weight percent, based on total charge). The reaction mixture was heated to 100°C., an additional 1.0 gram of stannous octoate was added, and the temperature was raised to 160°C. After allowing to react at 160°C. for 13 hours, the reaction product was cooled, discharged from the reactor and analyzed. The viscous liquid product had a Hydroxyl No. of 330 mg.KOH/gram. The acid number of the product was nil and its color rating (Gardner) was 1.0. Based on the said hydroxyl number and the presence of six hydroxyl groups per molecule, the product has an average molecular weight of 1020 and equivalent weight of 170. In the use of this polyol product in preparing the urethane coatings of Examples 7, 8 and 9 below it was assumed that one hydroxyl group would be sterically hindered and sluggish to react. Thus, for the purpose of calculating the amount of this polyol to be reacted with polyisocyanate, the product was assumed to have five reactive hydroxyl groups, that is, its equivalent weight was taken at 204 rather than 170. The product of this example is referred to herein as Polyol II.

In the examples which follow, the performance of the above-described Polyols I and II in forming clear and pigmented urethane coatings on metal substrates was evaluated. In each example, the polyisocyanate component of the two-package urethane coating was Polyisocyanate A identified in Table I above.

The physical properties of the various coatings include the following and were determined using the indicated standard procedures:

| Property | Test Procedure |
|---|---|
| Hardness, Sward | Sward Hardness Testor |
| Hardness, Pencil | The "leads" of pencils containing "lead" of different hardnesses are ground flat, perpendicular to the axis. The coating is then scratched with the edge of the "lead." The hardest pencil (e.g., H, 2H) which does not scratch the coating is designated as the pencil hardness of the coating. |
| Impact Resistance | Gardner Impact Testor |
| Stain Resistance | The respective samples are exposed to iodine and mustard for 24 hours. The ratings are visual and on a comparative basis as follows: |

Rating of Stain Resistance

| | |
|---|---|
| 1 = loss of coating | 6 = color dark |
| 2 = loss of adhesion | 7 = definite color |
| 3 = color dark, coating softened and some adhesion loss | 8 = slight color |
| 4 = color dark and coating softened | 9 = very slight color |
| 5 = color very dark | 10 = virtually no change |

| Property | Test Procedure |
|---|---|
| Adhesion | Cross-hatch (10 × 10 mm.) adhesion using 3M company No. 610 Hitack Tape; 100 = no loss of adhesion to "Bonderite" 37 steel substrate. |
| Abrasion Resistance | Taber Abrasion (1000 gram weight, 1000 cycles CS-10 wheel); indicates weight (mg.) lost during given test |

EXAMPLE 3

Polyol I produced in accordance with Example 1 and Polyisocyanate A identified in Table I were mixed at an —NCO/—OH equivalent ratio of 1.2/1.0, followed by the addition of Silicone A in an amount of 0.1 weight percent, based on the weight of total resin solids. The coating formulation was reduced to spray viscosity (20–25 seconds, No. 2 Zahn cup) with dry Cellosolve acetate. A film having a thickness of 1–2 mil (dry) was cast with a doctor knife on "Bonderite" 37 steel substrate. The coating, which was not catalyzed, was cured for 5 minutes at 150°C. As a control, a coating was prepared in the same manner except that Polyol A, identified in Table I above, was used in place of Polyol I. The relative amounts of polyol and isocyanate reactants required to obtain the —NCO/—OH ratio of 1.2/1.0, as well as physical properties of the respective coatings, are given in Table II which follows.

TABLE II

Clear Coatings Cured 5 Minutes at 150°C.

| | | |
|---|---|---|
| Example No. | 3 | — |
| Control No. | — | K-1 |
| Reactants | | |
| Polyol | I[1] | A[2] |
| grams | 24.16 | 15.72 |
| Polyisocyanate A, grams | 50.0 | 50.0 |
| Properties of Coating | | |
| Hardness, Sward | 54 | — |
| Hardness, Pencil | 2H | 2H |
| Impact Resistance | | |
| Front, in./lb. | 140 | 100 |
| Reverse, in./lb. | 160 | 120 |
| Stain Resistance | | |
| Iodine | 8 | 1 |
| Mustard | 9 | 6 |
| Adhesion | 100 | 100 |

[1]The 2/1 caprolactone triol/diepoxide adduct of Example 1.
[2]The caprolactone triol identified in Table I.

The data of Table II show that Polyol I of the invention provided a urethane coating having an overall combination of properties at least as good as the coating provided by control Polyol A and that this result was capable of being achieved employing a considerably lower ratio of polyisocyanate to polyol than required for Polyol A.

EXAMPLE 4

In accordance with this example, a coating was applied to "Bonderite" 37 steel employing Polyol I of Example I and Polyisocyanate A at an —NCO/—OH equivalent ratio of 1.2/1.0. In addition to Silicone A (0.1 weight percent, based on total resin solids), the coating formulation also contained dibutyltin dilaurate catalyst in an amount of 0.022 weight percent, based on the weight of Polyisocyanate A. As a further component and in order to insure a working pot-life (that is, time to gelation), acetic acid was added in an amount of one weight percent, based on Polyisocyanate A. The coating was reduced to spray viscosity (20–25) seconds, No. 2 Zahn cup) using dry Cellosolve acetate. A 1–2 mil (dry) film was cast with a doctor knife onto the steel substrate and was allowed to cure at room temperature for 19 days. As a control, a coating was prepared in the same manner (Control Run K-2) employing Polyol A in place of Polyl I. For the purpose of comparison, a coating (Comparative Ruc C-1) was prepared also employing the procedure and formulation of this example except that Polyol B, identified in Table I above, was used in place of Polyol I. The relative proportion of reactants and physical properties of the respective coatings are given in Table III which follows.

TABLE III

Catalyzed Clear Coatings

| Example No. | 4 | — | — |
|---|---|---|---|
| Control No. | — | K-2 | — |
| Comparative Run No. | — | — | C-1 |
| Reactants | | | |
| Polyol | I[1] | A[2] | B[3] |
| Grams | 24.16 | 15.72 | 43.6 |
| Polyisocyanate A, gms. | 50.0 | 50.0 | 50.0 |
| Pot Life, hours | 6.33 | 7.5 | >6 |
| Drying Time, hours | 1.33 | 1.5 | 1.0 |
| Physical Properties | | | |
| Hardness, Sward | 58 | 44 | 52 |
| Impact, Resistance | | | |
| Front, in./lb. | >160 | >160 | 80 |
| Reverse, in./lb. | >160 | >160 | 90 |
| Stain Resistance | | | |
| Iodine | 9 | 9 | 9 |
| Mustard | 7 | 8 | 8 |
| Adhesion | 100 | 100 | 100 |

[1] The 2/1 caprolactone triol/diepoxide adduct of Example 1.
[2] The caprolactone triol identified in Table I.
[3] The polyester polyol identified in Table I.

The results of Table III further demonstrate that Polyol I of the invention provides a urethane coating having an excellent combination of hardness, impact resistance and stain resistance.

EXAMPLE 5

This example is intended to illustrate the performance of the polyols of this invention in providing pigmented urethane coatings. For this purpose, titanium dioxide (TiO$_2$, rutile, in the form supplied by E. I. duPont and Company as R-960) was used as the pigment at 15 percent pigment volume concentration (PVC). Polyol I of Example 1 was combined with the pigment by ball milling in sufficient Cellosolve acetate to afford a suitable grinding rate. The pigmented polyol and Polyisocyanate A, identified in Table I, were then mixed at an —NCO/—OH equivalent ratio of 1.2/1.0. The formulation of this example also contained Silicone A, dibutyltin dilaurate catalyst and acetic acid in the respective amounts indicated under Example 4, and was reduced to spray viscosity (20–25 seconds, No. 2 Zahn cup) using Cellosolve acetate. The coating was applied to "Bonderite" 37 steel with a doctor knife and cured at room temperature for 14 days. As a control, a pigmented coating was prepared (Run K-3) employing the formulation and procudure of this example except that Polyol A was employed in place of Polyol I. For the purpose of comparison, another pigmented coating was prepared (Run C-2) following the procedure and using the formulation of this example except that Polyol B, identified in Table I, was used in place of Polyol I. As a further measure of the efficacy of the polyols of this invention in forming pigmented urethane coatings, a further coating was prepared (Comparative Run C-3) using the pigmented commercial aircraft coating formulation, identified in Table I as Formulation A. The physical properties of these various coatings are given in Table IV which follows.

TABLE IV

Pigmented Coatings

| Example No. | 5 | — | — | — |
|---|---|---|---|---|
| Control Run No. | — | K-3 | — | — |
| Comparative Run No. | — | — | C-2 | C-3 |
| Reactants | | | | |
| Formulation | — | — | — | A[2] |
| Polyol | I[1] | A[2] | B[2] | — |
| Polyisocyanate | | | A[2] | — |
| Pot Life, hours | 4.9 | 4.5 | ~7 | — |
| Drying Time, hours | 2.6 | 2.0 | 1.2 | — |
| Physical Properties | | | | |
| Hardness, Sward | 30 | 30 | 30 | 54 |
| Impact Resistance | | | | |
| Front, in./lb. | 65 | 130 | 100 | 40 |
| Reverse, in./lb. | 45 | 120 | 80 | 18 |
| Stain Resistance | | | | |
| Iodine | 8 | 8 | 7 | 7 |
| Mustard | 8 | 7 | 9 | 9 |
| Adhesion | 100 | 100 | 100 | 100 |
| Abrasion Resistance, mg. | 44.9 | 28.4 | 48.2 | 48.4 |

[1] The caprolactone triol/diepoxide adduct of Example 1.
[2] Identified in Table 1.

The results of Table IV indicate that Polyol I of the invention allows for the formation of pigmented urethane coatings having an acceptable overall combination of properties.

EXAMPLE 6

The purpose of this example is to demonstrate the usefulness of the polyols of this invention in preparing urethane top coatings for application to external aircraft surfaces which come into contact with hydraulic fluids. For this purpose, the pigmented formulation described under Example 5 was applied to aluminum as the test substrate instead of steel. Thus, in addition to Polyol I and Polyisocyanate A (—NCO/—OH ratio = 1.2/1.0) and the titanium dioxide pigment, the formulation contained Silicone A (0.1 weight percent, based on the total resin solids), dibutyltin dilaurate catalyst (0.022 weight percent) and acetic acid (1.0 weight percent), the latter percentages being based on the weight of Polyisocyanate A. A control coating (Run K4) and a comparative coating (Run C-4) were also prepared containing the same formulation components except that Polyol A and Polyol B, respectively, were used in place of Polyol I. For the purpose of measuring chemical resistance to hydraulic fluids against that of a coating applied to aircraft surfaces in commercial practice, a further comparative coating was prepared based on pigmented Formulation A (Run C-5) identified in Table I. The respective coatings were applied to standard aluminum test panels (Aluminum Alclad 7075T-6, 2-9/16 inches × 9 inches) which had been thoroughly cleaned, wash primed and primed. In each preparation, the top coat was reduced to a spray viscosity of 18–20 seconds (No. 2 Zahn Cup) with Cellosolve acetate/xylene (50/50 weight ratio) and was then spray applied in a wet cross coat application to 3.0 mils wet (or 1.5–1.7 mils dry). The coatings were allowed to cure for 14 days at room temperature. In addition to water immersion and cold flexibility tests which each of the coated panels passed, their resistance to the hydraulic fluid Skydrol 500-B was evaluated. This hydraulic fluid, which is used in the aircraft industry, is diphenyl 2-ethylhexyl phosphate and is available from Monsanto Company. The conditions under which the coatings were subjected to this hydraulic fluid are given in Table V as Conditions I, II III and IV. After each condition, the respective panels were rated visually for coating changes such as gloss, softening, loss of adhesion and blistering. The results are also given in Table V which follows.

resistance of the coatings to the hydraulic fluid, Skydrol 500-B. For the latter purpose, the coatings were spray applied to the standard test aluminum panels described under Example 6 following substantially the same procedure. The coatings on the steel substrate were spray applied over unprimed Bonderite 37 steel.

TABLE V

Resistance of Pigmented Coatings To Hydraulic Fluid

| | SKYDROL RESISTANCE | | | |
|---|---|---|---|---|
| | Condition I[1] | Condition II[2] | Condition III[3] | Condition IV[4] |
| Example No. 6[5] | Slight swelling at scribe | No Change | Slight swelling at scribe | Swelled along scribe |
| Control Run K-4[6] | Slight swelling at scribe | No Change | Slight swelling at scribe | Swelled along scribe |
| Comparative Runs | | | | |
| C-4[7] | Slight loss of gloss and slight swelling at scribe | Slight loss of gloss | Slight swelling at scribe | Swelled along scribe |
| C-5[8] | Loss of gloss and slight swelling at scribe | Loss of gloss | Slight loss of gloss | Slight swelling along scribe and loss of gloss |

[1]Condition I = Scribed panel immersed in Skydrol for 5 days at 120°F.
[2]Condition II = Unscribed panel immersed in Skydrol for 5 days at 120°F.
[3]Condition III = Scribed panel immersed in Skydrol for 30 days at room temperature.
[4]Condition IV = Scribed panel mounted at a 45° angle, and scribe saturated with Skydrol three times daily for 30 days.
[5]Coating formulation based on the 2/1 caprolactone triol/diepoxide adduct of Example 1.
[6]Coating formulation based on Polyol A, identified in Table I.
[7]Coating formulation based on Polyol B, identified in Table I.
[8]Coating formulation was Formulation A, identified in Table I.

The results of Table V demonstrate that Polyol I of the invention provides a urethane coating having excellent Skydrol resistance.

EXAMPLES 7, 8 and 9

In accordance with these examples, clear and pigmented two-package urethane coatings were prepared based on Polyol II of Example 2. The coatings were reduced to spray viscosity (20–25 seconds, No. 2 Zahn cup) using Cellosolve acetate, and were applied to rigid metal substrates. The components of the respective formulations and the curing conditions are given in Table VI below which also sets-forth physical property data, chemical resistance and low temperature flexibility of the respective coatings. All tests are based on coated "Bonderite" 37 steel except for the tests to determine The results of Table VI show that the clear coatings of Examples 7 and 8 exhibited high hardness, good impact resistance and excellent adhesion, chemical resistance and low temperature flexibility. Although the incorporation of pigment (15% PUC) provided a softer coating (Example 9) of lower impact resistance which are nevertheless of satisfactory values, the pigmented coating exhibited the Skydrol resistance and low temperature flexibility required of commercial aircraft coatings.

Pigmented urethane coatings employing the formulation of Example 9 of Table VI were also subjected to weatherability tests in a standard weatherometer ("Atlas Weather-Ometer" Single-Arc Enclosed Carbons). In these tests, the substrate was "Bonderite" 37 steel. After 1000 hours exposure, no discoloration, fad-

TABLE VI

Clear and Pigmented Coatings

| Example No. | 7 | 8 | 9 |
|---|---|---|---|
| Formulation (—NCO/—OH = 1.2/1.0) | | | |
| Polyol II[1], pts. by wt. | 35 | 35 | 35 |
| Polyisocyanate A[2], pts. by wt. | 50 | 50 | 50 |
| Cellosolve Acetate, wt. %[3] | 30 | 30 | 40 |
| Dibutyltin Dilaurate, wt. %[4] | None | 0.02 | 0.02 |
| Titanium Dioxide, pts. by wt. | None | None | 38.7 |
| Cure | 5 Minutes at 150°C. | 14 days at Room Temperature | |
| Drying Time, hours | | | |
| Tack-free | — | 1.0 | 1.0 |
| Paper-free | — | 6.0 | 6.0 |
| Physical Properties | | | |
| Impact Resistance in./lbs. | | | |
| Reverse | 100 | 160 | 50 |
| Face | 120 | 160 | 65 |
| Hardness | | | |
| Pencil | 2H | 2H | H |
| Sward | 58 | 56 | — |
| Adhesion | | Excellent | |
| Chemical Resistance | | | |
| Skydrol 500-B[5] | | Excellent | |
| Water[6] | | Excellent | |
| Low Temperature Flexibililty[7] | | No Cracks | |

[1]The 2/1 caprolactone triol/diepoxide reaction product of Example 2.
[2]As defined in Table I.
[3]Based on total weight of system.
[4]Based on total resins.
[5]5 days immersion of scribed aluminum panel at 120°F. (Condition I of Table V herein).
[6]24 hour immersion.
[7]Rapid bend over 1-inch pipe at −60°F.

ing, chalking or blistering was observed. The only change observed during this period of exposure in the Weather-Ometer was a moderate loss of gloss. Such coatings were also subjected to the following exposures: 100 percent relative humidity at 120°F. for 350 hours; water immersion at 100°F. for 350 hours; and a 5 percent salt fog at 95°F. for 350 hours. After the indicated periods of time no effect on the coating was observed.

EXAMPLE 10

In accordance with this example, 3,4-epoxycyclohexylmethyl (3,4-epoxycyclohexane)carboxylate was reacted with a trimethylolpropane-initiated poly(epsiloncaprolactone) triol having an average Hydroxyl No. of 310 and an average molecular weight of about 540. The said diepoxide was used in an amount of 139.2 grams (based on purity, 0.5 mole) and the polycaprolactone triol was used in an amount of 525.9 grams (1 mole). The reaction was effected in the presence of stannous octoate catalyst (0.33 grams, 0.05 weight percent of reaction mixture), at a temperature of 160°C. for 8.5 hours, following substantially the procudure described under Example 1. After this period of time, the epoxide content was nil. The product was a very viscous material (Acid No. = nil) having a Hydroxyl No. of 243 (theor. = 258), and an equivalent weight of 230.9 (theor, = 217), based on an —OH functionality of six. Reaction of the product of this example with organic polyisocyanates such as, for example, Polyisocyanate A, as described in the foregoing Examples 3–9 also provides polyurethanes which are suitably applied as coatings on flexible or metal substrates.

It is evident that the caprolactone polyol-polyepoxide reaction products of the present invention provide urethane coatings, both clear and pigmented, having performance properties exhibiting suitable hardness, good weatherability and chemical resistance which are particularly desirable in top coatings for aircraft.

What is claimed is:

1. A polyol composition prepared by the reaction of (a) a caprolactone polyol having an average of at least three hydroxyl groups per molecule and (b) a polyepoxide having at least two vicinal epoxy groups per molecule, said reactant (a) being employed in an amount at least sufficient to effect substantially complete reaction of the epoxy groups of (b).

2. A polyol composition as defined in claim 1 in which said caprolactone polyol (a) is a caprolactone triol and said polyepoxide (b) is a cycloaliphatic diepoxide, and (a) is employed in an amount from about 1.8 to about 2.5 moles per mole of (b).

3. A polyol composition as defined in claim 2 in which said caprolactone triol (a) is used in an amount of about two moles per mole of (b).

4. A polyol composition formed by reaction at a temperature from about 100°C. to about 190°C. of:
a. a caprolactone polyol having an average of from three to six hydroxyl groups per molecule; and
b. a cycloaliphatic diepoxide having the formula,

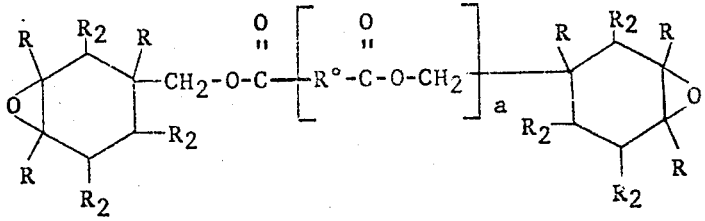

where R represents hydrogen or an alkyl group having from one to four carbon atoms, R° represents a valence bond or a bivalent hydrocarbon radical having from 1 to 9 carbon atoms, and $a$ has a value of zero or one;

the mole ratio of (a) to (b) being from about 1.8:1 to about 2.5:1.

5. A polyol composition as defined in claim 4 in which (b) has the said formula wherein $a$ has a value of one and six of the nine R groups bonded to each cyclic nucleus are hydrogen and the remaining R groups are hydrogen or methyl.

6. A polyol composition as defined in claim 4 in which (b) has the said formula wherein $a$ is zero and six of the nine R groups bonded to each cyclic nucleus are hydrogen and the remaining R groups are hydrogen or methyl.

7. A polyol composition prepared by the reaction at a temperature between about 100°C. and about 190°C. of: (a) a caprolactone triol having an average molecular weight no higher than about 1300, and (b) a 3,4-epoxycyclohexylmethyl 3,4-(epoxycyclohexane)-carboxylate, the mole ratio of (a) to (b) being from about 1.8:1 to about 2.5:1.

8. A polyol composition prepared by the reaction of: (a) a caprolactone triol having an average hydroxyl number from about 185 to about 560 prepared by the reaction of trimethylolpropane and epsiloncaprolactone, and (b) 3,4-epoxycyclohexylmethyl (3,-4-epoxycyclohexane)carboxylate, the said reaction being effected at a temperature between about 100°C. and about 190°C. in the presence of a tin carboxylate as catalyst, employing about two moles of (a) per mole of (b).

9. A polyol composition as defined in claim 8 in which (a) has an average hydroxyl number of about 560.

10. A polyol composition as defined in claim 8 in which (a) has an average hydroxyl number of about 310.

11. A polyol composition as defined in claim 8 in which the reaction of (a) and (b) is effected at a temperature from about 130°C. to about 175°C. in the presence of stannous octoate catalyst and for a sufficient period of time to reduce the epoxy content of the reaction system to less than about 0.5 weight percent.

12. A polyol composition as defined in claim 1 in which (a) is a caprolactone triol having an average hydroxyl number from about 130 to about 560, and (b) is 3,4-epoxycyclohexylmethyl (3,4-epoxycyclohexane)carboxylate.

* * * * *

UNITED STATES PATENT OFFICE
CERTIFICATE OF CORRECTION

Patent No. 3,896,303   Dated July 22, 1975

Inventor(s) Richard M. Gerkin and Lowell R. Comstock

It is certified that error appears in the above-identified patent and that said Letters Patent are hereby corrected as shown below:

Column 2, line 51, the word before "alcohol" should read -- polyhydric --. Column 10, line 6, for "vary" read -- very --. Column 11, line 51, for "Cellosolue" read -- Cellosolve --. Column 13, line 30, for "at" read -- as --; line 66, for "company" read -- Company --. Column 14, line 25, for "Ii" read -- II --. Column 15, line 5, for "Ruc" read -- Run --; line 58, for "procudure" read -- procedure --. Column 16, Table IV, opposite the left-hand legend "Polyisocyanate" and under the first and third columns, in each instance, read -- $A^2$ --. Columns 17-18, Table VI, opposite the left-hand legend "Adhesion" and under columns headed "7" and "9", in each instance, read -- Excellent --; Table VI, opposite the left-hand legend "Skydrol 500-B$^5$" and under columns headed "7" and "9", in each instance, read -- Excellent --; Table VI, opposite the left-hand legend "Water$^6$" and under columns headed "7" and "9", in each instance, read -- Excellent --; Table VI, opposite the legend "Low Temperature Flexibility$^7$" and under columns headed "7" and "9", in each instance, read -- No Cracks --. Column 18, line 30, for "PUC" read -- PVC --. Column 19, line 33, for "procudure" read -- procedure --. Column 20, line 57, for "ocotate" read -- octoate --.

Signed and Sealed this first Day of June 1976

[SEAL]

Attest:

RUTH C. MASON
Attesting Officer

C. MARSHALL DANN
Commissioner of Patents and Trademarks